United States Patent [19]
Koch

[11] 4,401,216
[45] Aug. 30, 1983

[54] MEDIA STORAGE DEVICE

[76] Inventor: Richard C. Koch, 533 Cinnabar Dr., Livermore, Calif. 94550

[21] Appl. No.: 225,412

[22] Filed: Jan. 15, 1981

Related U.S. Application Data

[63] Continuation-in-part of Ser. No. 90,271, Nov. 1, 1979.

[51] Int. Cl.³ .................................... B65D 85/672
[52] U.S. Cl. ........................... 206/387; 220/23.4; 220/23.6; 220/345; 220/351
[58] Field of Search ............ 206/387, 445, 309; 312/12, 14, 350, 107; 220/23.4, 23.6, 345, 351

[56] References Cited

U.S. PATENT DOCUMENTS

| | | | |
|---|---|---|---|
| 1,268,141 | 6/1918 | Nystrom | 312/12 |
| 3,395,849 | 8/1968 | Gillam | 220/345 |
| 3,763,994 | 10/1973 | Somers | 206/387 |
| 3,856,369 | 12/1974 | Commiant | 220/23.4 |
| 3,899,229 | 8/1975 | Ackeret | 206/387 |

FOREIGN PATENT DOCUMENTS

| | | | |
|---|---|---|---|
| 7709480 | 8/1977 | Netherlands | 206/387 |
| 943077 | 9/1962 | United Kingdom | 312/350 |
| 1539870 | 2/1979 | United Kingdom | 220/23.4 |

*Primary Examiner*—Joseph Man-Fu Moy
*Attorney, Agent, or Firm*—Thomas E. Schatzel

[57] ABSTRACT

A device adapted for storing items, in particular, magnetic information media, said device including a hollow exterior rectangular box having depressions and ridges such that the box may be stacked efficiently with other identical boxes to have lateral interlocks both on the vertical and horizontal surfaces and including in the interior thereof guide rails for receiving a drawer. The drawer is designed to be usable in either of two orientations, the second orientation being a 90° rotation from the first, the drawer further including walls for enclosing the media and a hinged gate for allowing the media to tilt forward for ready access while restraining the media within the drawer.

12 Claims, 14 Drawing Figures

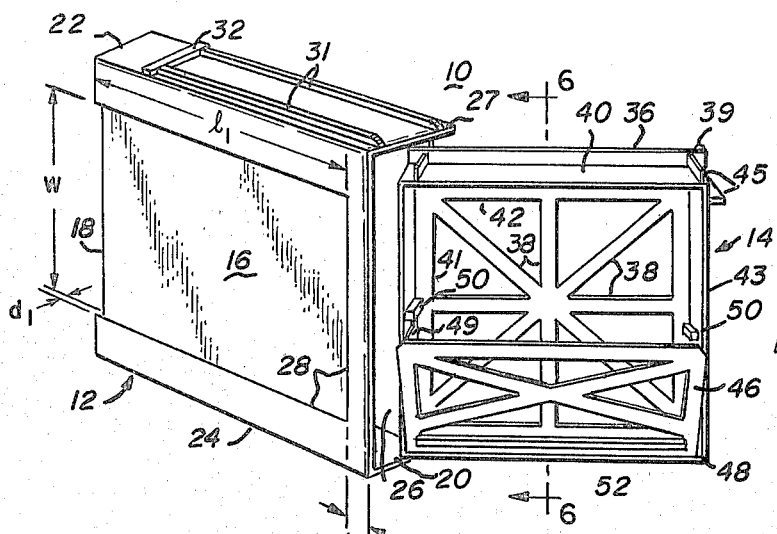
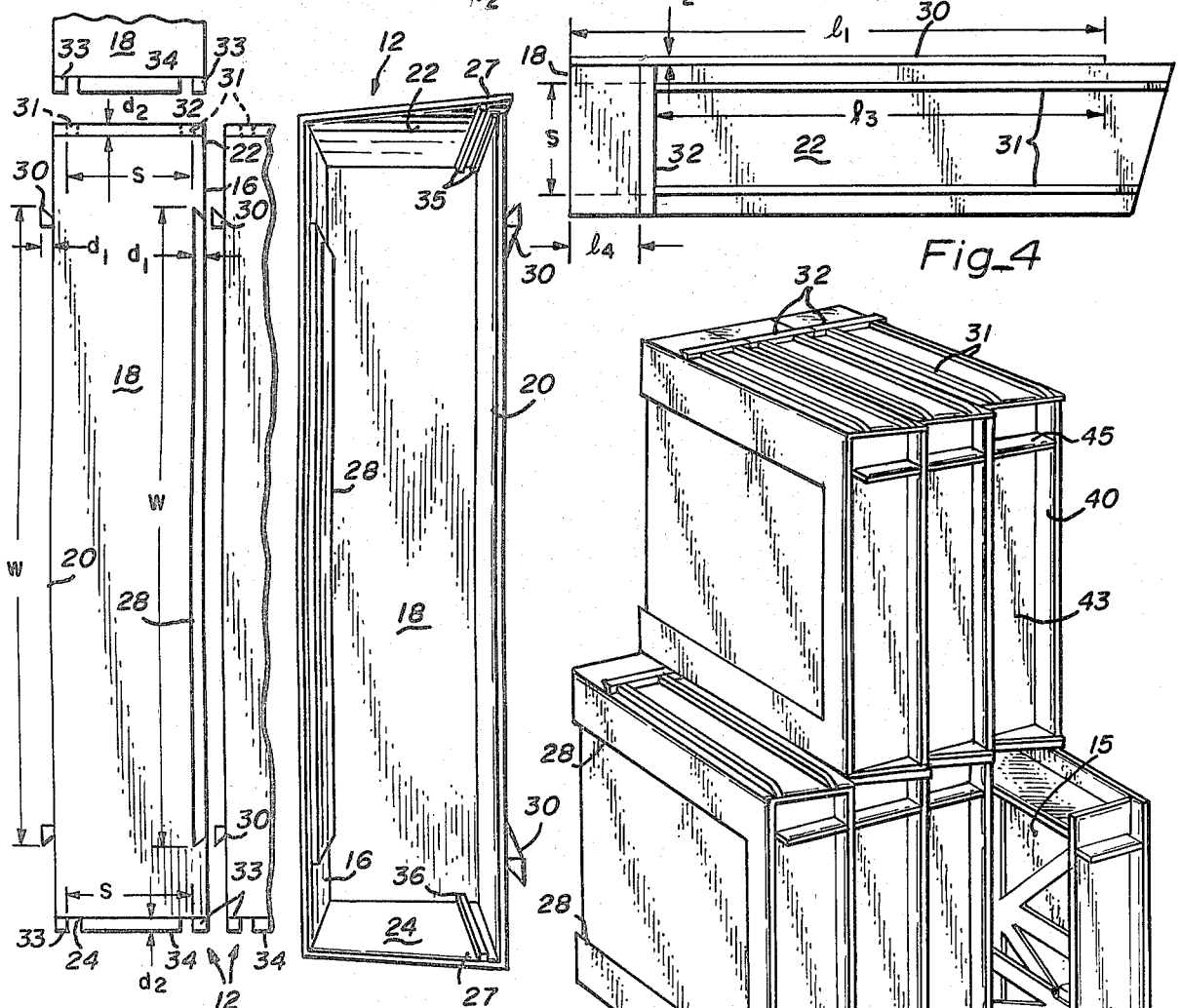
Fig_1 Fig_2 Fig_3 Fig_4 Fig_8

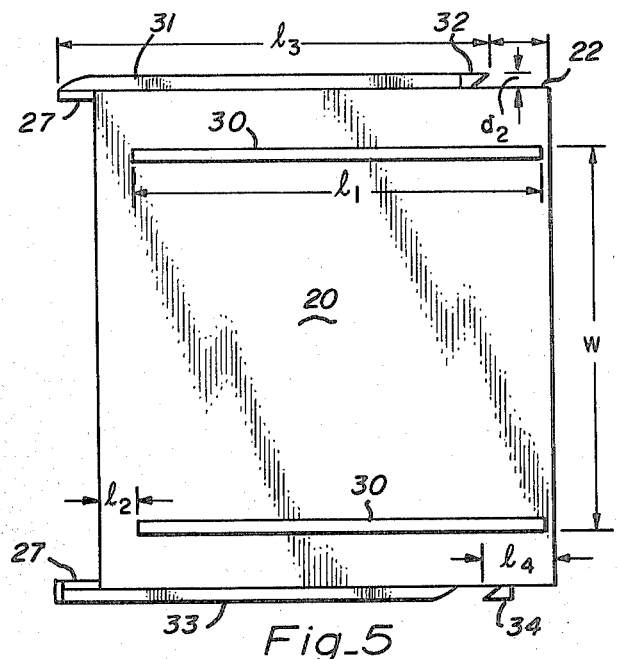
Fig_5
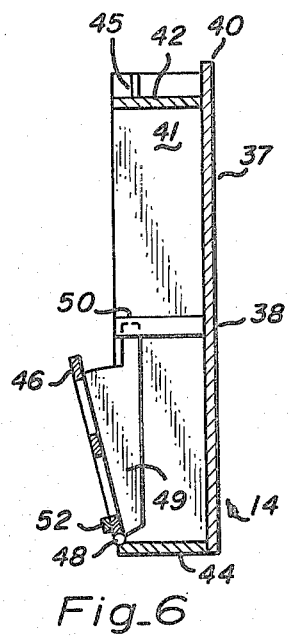
Fig_6
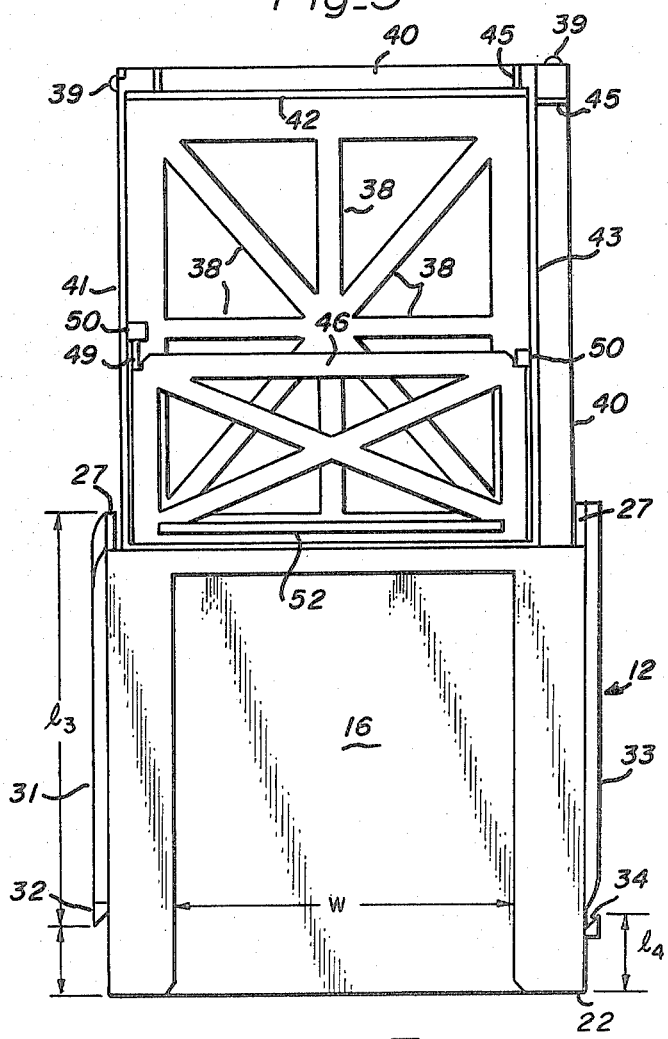
Fig_7
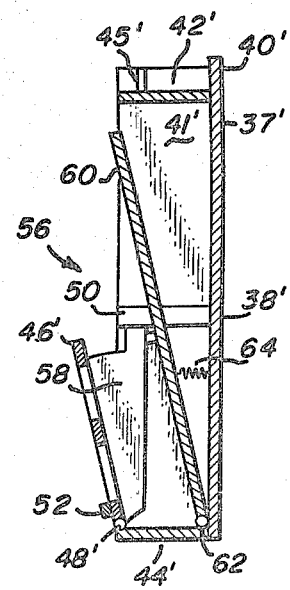
Fig_9

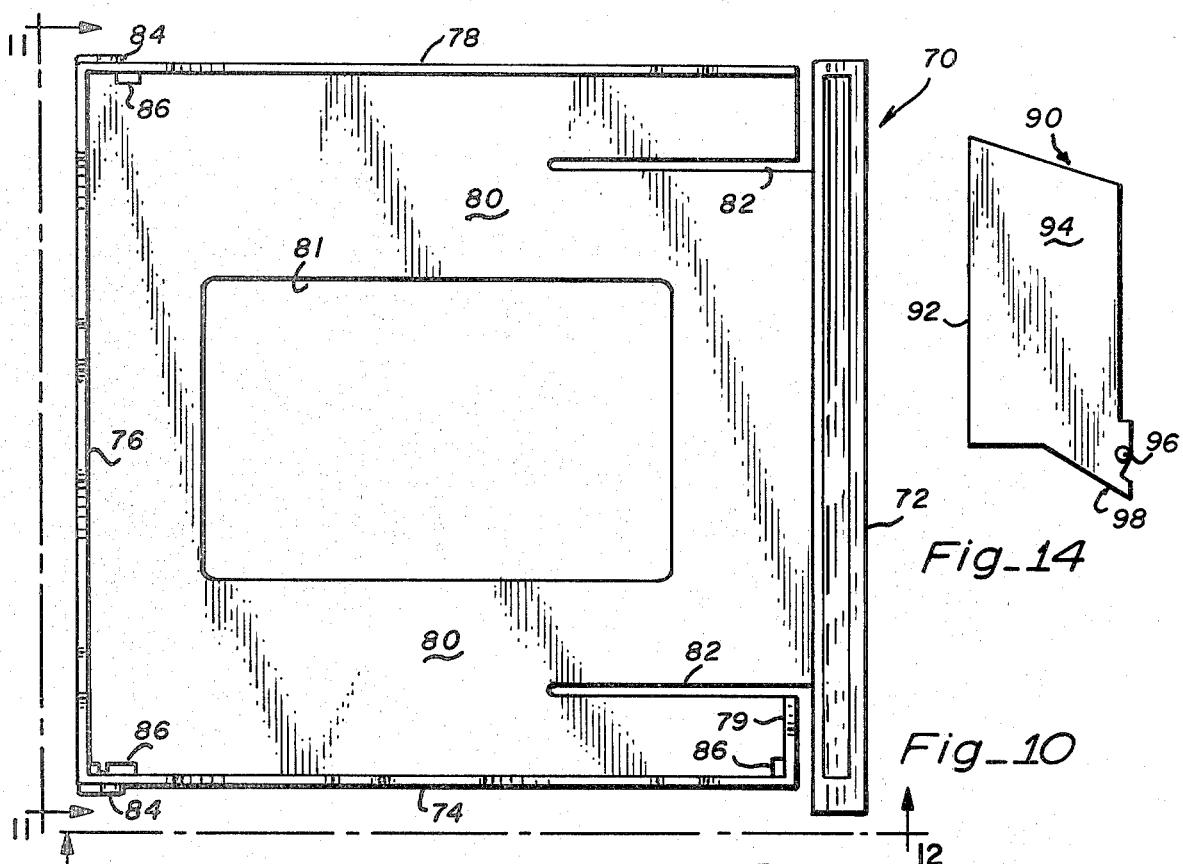
Fig_14
Fig_10
Fig_11
Fig_12
Fig_13

MEDIA STORAGE DEVICE

The present application is a continuation-in-part of Ser. No. 090,271 filed Nov. 1, 1979, for a "MEDIA STORAGE DEVICE." The prior application has been partially examined by Group Art Unit No. 241 with the Examiner being J. Man-Fu Moy.

BACKGROUND OF THE INVENTION

1. Field of the Invention

This invention relates generally to devices for storing items and more specifically to a storage device specifically designed for storing magnetic information recording media.

2. Description of the Prior Art

The burgeoning data processing industry has created a significant demand for devices on which information can be stored. It is inefficient to utilize the permanent memory of data processing apparatus for storage of data and information. Therefore, the main thrust has been towards improvement and increase in removable permanent storage media.

In the early days of the computer industry, most of this information was stored on computer cards. However, these cards were bulky and inefficient. The rapidly improving technology of magnetic storage media has provided a far superior method of permanently storing information than on the old computer cards. Consequently, the currently most common media for information storage are magnetic tape, either in reel-to-reel or cassette mode; cards coated with magnetic materials (mag cards); and magnetic disks, that is, platters coated with magnetic materials which are designed so as to be rotated in the same manner as a phonograph record for easy access to information contained at any point on the surface of the disk. The disks are either "hard" that is rigid like a phonograph record or "floppy" flexible disks. Floppy disks are ordinarily contained in semi-rigid disk packs. Each of these media appears in various sizes.

One of the difficulties which has arisen regarding such information storage media is the method of storing the tapes, cards or disks themselves in an efficient and protective manner. The information contained on the media surfaces is subject to loss if the surfaces are unprotected while in storage. Consequently, it is necessary to store the media in environments protected from abrasion, dust, other corrosive elements and, at times, from strong magnetic fields. Furthermore, as time goes by, the pure volume of magnetic storage media in existence increases. This multiplication of magnetic media elements requiring easy access storage necessitates compact and efficient means for storage of large volumes of the different media.

Various attempts have been made in the prior art to provide effective storage devices for the information containing media. Three of these are described in U.S. Pat. No. 3,760,937, issued to Van Wyngarden et al, U.S. Pat. No. 3,642,337 issued to Manheim, and U.S. Pat. No. 3,836,222 issued to Kuntze. Each of these patents describes an attempt to store a type of magnetic information media in a well protected, but yet relatively compact manner.

However, several difficulties remain which have not been cured by prior art attempts such as these. The described prior art tends to be rigid in its application in that each type of container in the art is restricted to a certain individual type of media. Another common disadvantage is that the prior art devices are not always amendable to volume storage in that they either do not stack compactly or else need external support to overcome instability caused by a smooth slidable interface between adjacent devices. In volume situations, access to the media is often restricted. Furthermore, the prior art attempts have frequently been unduly complex, expensive and difficult to manufacture. No prior art device effectively provides economical and simple protection for a wide variety of information media while further providing for easy stacking and efficient storage of large numbers of devices themselves.

SUMMARY OF THE INVENTION

It is therefore an object of the present invention to provide a device for storing various information-containing media in a manner that the media surfaces are well-protected from abrasion, dust and the elements.

It is a further object of the present invention to provide a device for storing information-containing media wherein the device is constructed such that large numbers of the devices can be efficiently and economically stored together in an abutting and/or adjacent relationship while retaining ready access to the media.

It is yet another object of the present invention to provide a device for storing information containing media wherein the device is simple and economical to manufacture.

Briefly, a preferred embodiment of the present invention includes an exterior box having exterior depressions and ridges or rails such that the box will interlock or slidably fit with other identical boxes. The interior of the box is hollow and one end is open to slidably receive a drawer therein. A drawer, adapted for sliding into said box through said open end so as to be utilizable in either of two orientations is included. The drawer has a back plate and side walls extending from said back plate. The drawer is open to one side and provided with a hinged gate mechanism extending over a portion of the opening. With the drawer "open," the hinged gate mechanism may swing "out" to allow the media stored therein to tilt forward for easy access. The drawer further includes stops for restricting the forward tilt of the gate so as to restrain the media to within the drawer.

It is an advantage of the present invention that the unique construction of the exterior box provides for interlocking between adjacent devices according to the invention and thereby allows any number of the boxes to be readily stacked or stored together in a stable relationship.

Another advantage of the present invention is that the box and drawer mechanism provides complete protection of the media stored therein while also providing easy access thereto.

A further advantage of the present invention is that the feature which allows the drawer to be properly utilized in either of two orientations allows the device to be utilized when stacked either upon the bottom or on the back surface of the box.

These and other objects and advantages of the present invention will become apparent after reading the following detailed description of the preferred embodiments which are illustrated in several figures of the drawings.

IN THE DRAWING

FIG. 1 is a perspective view of a preferred embodiment of the media storage device of the present invention shown in the shelf orientation with the drawer portion extended so as to rotate about hinge points;

FIG. 2 is a back elevational view of the box portion of the embodiment of FIG. 1 and partially illustrating a second and a third box interacting with the first box;

FIG. 3 is a front perspective view of the box portion of the preferred embodiment of FIG. 1 with the drawer removed to illustrate the interior of the box portion;

FIG. 4 is a top plan view of the box of the embodiment of FIG. 1;

FIG. 5 is a right-side elevational view of the box of the embodiment of FIG. 1;

FIG. 6 is a cross-sectional view taken along line 6—6 of FIG. 1 illustrating drawer portion;

FIG. 7 is a left-side elevational view of the media storage device of the present invention shown in the upright orientation, indicating the manner in which the drawer may be placed into the box in an orientation rotated 90° from the orientation of FIG. 1;

FIG. 8 is a perspective view illustrating a number of the media storage devices of FIG. 1 stacked together in the shelf orientation;

FIG. 9 is a cross-sectional view taken along line 6—6 of FIG. 1 showing an alternate embodiment of the drawer portion;

FIG. 10 is a left-side elevational view of a second alternate drawer embodiment;

FIG. 11 is a bottom plan view of the alternate drawer embodiment of FIG. 10;

FIG. 12 is a back elevational view of the alternate drawer embodiment of FIG. 10;

FIG. 13 is a front plan elevational view of a gate mechanism for use with the drawer embodiments of FIG. 10; and FIG. 14 is a side elevational view of the gate of FIG. 13.

DESCRIPTION OF THE PREFERRED EMBODIMENT

The present invention is a device for storing items, and is particularly adapted to contain magnetic information storage media. It is designed so as to provide ready access and adequate protection to the media contained herein while making economical use of the storage space available.

A preferred embodiment of the present invention is illustrated in FIGS. 1 through 8 of the drawing and referred to by the general reference character 10. The embodiment 10 is adapted for storing magnetic recording discs, either hard or floppy, when the disks are not being used on disk-drive of a computer or data processing system. Computer installations frequently require a large number of disks of this type to be stored. However, these disks must also be maintained to be readily available for use when the particular information contained thereon is needed. Further storage is needed to contain blank discs, or as small disks are called, "diskettes", for ready access when new storage media is required.

In FIG. 1, the media storage device 10 is shown in the "shelf orientation". The shelf orientation is intended for application wherein the storage device 10 is to be placed on a shelf or other position so that access to the stored information is gained from the front of the container. The "shelf orientation" is the most common orientation for application of the media storage device 10 and consequently is used to provide the basis from which the directional denominations used in the drawing and in the description are derived.

Media storage device 10 comprises two main elements. These elements are an outside container box 12 and a drawer 14 for slidably fitting into the box 12. Both the box 12 and the drawer 14 include several sub-elements. The drawer 14 is adapted to carry a plurality of recording media 15, e.g. floppy disks, or hard disks, or etc.

The sub-elements which make up box 12 are illustrated best in FIGS. 1 through 5 and FIG. 7. Box 12 is comprised of a set of five exterior walls. These exterior walls are a left-side wall 16 (see particularly FIGS. 1 and 7), a back wall 18, (see particularly FIGS. 2 and 3), a right-side wall 20 (see particularly FIG. 5), a top wall 22 (see particularly FIGS. 1 and 4), and a bottom wall 24 (see particularly FIG. 3). Left and right-side walls 16 and 18 are formed so as to have the outline of congruent squares. Back wall 18, top wall 22 and bottom wall 24 form elongated rectangles having a length equal to a side of the squares formed by the right and left-side walls 16 and 20 and a width chosen so as to snugly accommodate the drawer 14 when the drawer 14 is slid into the box 12. The width of walls 18, 22, and 24 may be as desired, depending upon the thickness and quantity of individual information storage media to be contained within the device 10.

Exterior walls 16, 18, 20, 22 and 24 form five of the six sides of a rectangular solid. The sixth side of box 12 is open to comprise a front opening 26. It is through front opening 26 that drawer 14 is received into box 12.

Both the top wall 22 and the bottom wall 24 include, on the front edges thereof, a triangular extension 27 (see particularly FIGS. 4 and 5). Extensions 27 are shaped to form right triangles which protrude a distance "x" (see FIG. 4) beyond the right-side wall 20 and over the area of the front opening 26 and do not extend beyond left-side wall 16. Extensions 27 provide bases upon which stop-pivot points may be established to restrict the sliding of drawer 14 as hereafter described. As may be seen in FIG. 1, it is necessary that the stop-pivot points be situated beyond the interior of box 12 so that the drawer 14 may freely pivot thereabout. Consequently distance "x" is selected to be sufficient for the drawer to pivot without being restricted by the sides of the boxes. The pivoting feature, as illustrated in FIG. 1, is valuable to the operator to provide for convenient inspection of the contents of drawer 14.

An advantage of the media storage device 10 is that a plurality of the devices 10 may be stacked and interlocked with each other in rows and/or columns, as desired. An example of common storage and stacking of a number of the devices 10 in both the lateral and vertical positions is illustrated in FIG. 8. In meeting this objective, the exterior walls of box 12 are provided with means for engaging and partially interlocking with further means on identical boxes 12 so as to create a stable stacking relationship.

An element of the stacking means is a wide shallow "U-shaped" depression 28 of a width "w", a depth "d", and a length "l" in the left-side wall 16. The "U-shaped" depression 28 is situated so as to be vertically centered about the left-side wall 16 and is displaced from the front edge of left side wall 16 by a distance "$l_2$". Depression 28 has the sides thereof undercut as shown in FIG.

2. The depression 28 is designed to engage a pair of right-side rails 30 situated on right wall 20 of box 12 (see particularly FIGS. 2, 4, and 5). Right side rails 30 are parallel to one another, have a length equal to or less than the length "$l_1$" of depression 28, a depth or thickness "d", and a separation between the outside edges of the rails 30 of "w". Each right-side rail 30 is undercut on the exterior surface so as to mate with the undercut side walls of depression 28. As particularly shown in FIG. 2, the right side rails 30 on one box 12 will fit relatively snugly into depression 28 of another box 12. The thickness or depth "$d_1$" of the right-side rails 30 is approximately equal to the depth "$d_1$" of depression 28 which is situated on the left side of box 12. The outside separation "w" of right-side rails 30 is approximately equal to the inside width "w" of depression 28. The undercuts on rails 30 match those on the sides of depression 28. Thus, the right-side rails 30 mate with depression 28 and may slide therein along the axis of the rails. As illustrated in FIG. 5, the front end of right-side rails 30 are displaced backwards from the front of right-side wall 20 by a distance "$l_2$" which is equal to the displacement of the front edge of depression 28 from the front edge of left side wall 16, as shown in FIGS. 1 and 7. This relationship is necessary such that when right side rails 30 are slid into depression 28 they will stop when the front ends of rails 30 contact the front edge of depression 28. This feature provides that when boxes are slid together, a discrete stop and alignment point is reached such that when a number of devices 10 are stacked together their front edges will all be aligned as illustrated in FIG. 8.

The interaction of right side rails 30 and depression 28 forms a lateral interlock between adjacent boxes 12. This type of interlock effectively inhibits shifting of devices 10 when stored in this manner except precisely along the axes of the right-side rails 30.

The media storage devices 10 of the present invention are provided with a further means of interlocking adjacent devices 10 together. This interlock functions in a dimension perpendicular to the interlock of depression 28 and right side rails 30. The means of this engagement is provided by a pair of parallel top rails 31 situated on the top wall 22 of box 12 and including a cross rail 22 situated across the back ends of the top rails 31 and a further pair of parallel bottom rails 31 including a cross catch 34 situated on the exterior of bottom wall 24. Top rails 31 and cross rail 32 are shown particularly in FIGS. 1, 2, 4, 5 and 8 while bottom rails 33 and cross-catch 34 are best illustrated in FIGS. 2 and 5.

Top rails 31 have a length "$l_3$", a depth or thickness "$d_2$" and an inside separation "s". Top rails 31 are situated on the exterior surface of top wall 22. Situated at or beyond the rear ends thereof is a cross rail 32 which also has a depth "$d_2$". Cross rail 32 is undercut on its back surface. The outside or back edge of cross rail 32 is displaced from back wall 18 by a distance "$l_4$" (see FIG. 4).

Bottom rails 33 and cross-catch 34 are adapted for sliding between top rails 31 such that cross-catch 34 engages cross rail 32 and the interaction among the four elements forms an interlock. As shown in FIGS. 2 and 5, bottom rails 33 and cross-catch 34 also have a thickness or depth "$d_2$". Bottom rails 33 have a length "$l_3$" and further have an exterior separation of "s" so that the distance between the outside edges of bottom rails 33 is approximately equal to the distance between the inside edges of top rails 31. Cross-catch 34 is undercut on its forward surface so as to mate with cross rail 32. The front edge of cross-catch 33 is separated from back wall 18 by a distance "$l_4$". Thus the front edge of cross-catch 33 mates with the back surface of cross rail 32 when adjacent boxes 10 are aligned as shown in FIG. 8.

The interaction between top rails 31 and bottom rails 33 prevents lateral sliding between adjacent boxes except along the axes of the rails. The mating between cross rail 32 and cross-catch 34 acts both to stop and align the slidable interlock and further to prevent the devices 10 from tipping forward when the drawer 12 is extended without the restriction provided by the cross rail 32—cross-catch 34 interaction. The weight of a loaded drawer would tend to overbalance the device 10 and cause instability.

The combination of the interactions of depression 28 with right side rails 30 and top rails 31, cross rail 32, bottom rails 33 and cross-catch 34 effectively creates a stable stacking relationship between adjacent devices 10.

The interior of box 12 is particularly illustrated in FIG. 3. In this figure it may be seen that depression 28 encroaches into the interior space of box 12. It may also be seen that the thickness of walls 16, 18, 20, 22, and 24 is relatively thin. This dimension is chosen such that the devices 10 may be light in weight and economical to manufacture.

The interior of box 12 is provided with a set of top drawer guides 34 situated on the interior surface of top wall 22 and a bottom drawer-guide 36 situated on the interior of bottom wall 24. Drawer guides 35 and 36 are adapted for receiving drawer 14 and maintaining drawer 14 at the proper orientation within box 12. As may be seen in FIG. 5, drawer-guides 35 and 36 extend onto extensions 27, a distance such that the front ends, and consequently the stop points, of drawer-guides 35 and 36 are situated beyond the confines of the interior of box 12. This allows for the stop points created by drawer-guides 35 and 36 to be pivot points for the rotation of drawer 14 as illustrated in FIG. 1.

The sub-elements of the drawer 14 are illustrated in FIGS. 1, 6 and 7. Drawer 14 provides a subcontainer for the recording media 15 (see FIG. 8) or other items to be contained within the device 10. Drawer 14 is designed so as to slidably fit into box 12 and also to provide for convenient access to the media or other items stored therein while preventing the recording media 15 from escaping therefrom and further providing protection for the surfaces of the recording media 15.

Drawer 14 includes a back base 37 upon which the other sub-elements are mounted. Back base 37 has a square outline of dimensions slightly less than those of the right and left-side walls 16 and 20 of the box 12. The dimensions of back base 37 are selected such that drawer 14 will readily slide within the interior of box 12 while retaining maximum utilization of the space therein. With a view toward saving material and thus making the manufacture more economical, the back base 37 of the preferred embodiment 10 is constructed of a plurality of support struts 38 which frame open spaces. Support struts 38 provide the structural strength required for the drawer 14. Situated at points near the corners of the edges of back base 37 are a plurality of protrusions 39. Protrusions 39 serve the purposes of providing a snap-lock engagement with the interior of box 12 when drawer 14 is closed and further provide for maintaining drawer 14 within the drawer guides 35 and 36 (see FIG. 3) in the interior of box 12 during the sliding movement. Protrusions 39 are situated at the points on the exterior of back base 37 which, in the various orientations of drawer 14, may either engage the drawer guides 35 and 36 or be on the front side edges of drawer 14 for providing the snap-lock mechanism.

Back base 37 further includes a pair of flanges 40. Flanges 40 are rectangular areas of solid material which extend beyond the ends of struts 38 on two of the sides of back base 37. One of the purposes of flanges 40 is to provide handles by which drawer 14 may be grasped.

Mounted upon back base 37, and perpendicular thereto, are a first wall 41, a second wall 42, a third wall 43, and a fourth wall 44 (shown only in FIG. 6). Walls 41, 42, 43 and 44 form, in combination with back base 37, a square enclosure, open to the front, for receiving the media 15 or other items to be stored within the device 10. Walls 41, 42, 43 and 44 provide protection for the edges of the media 15 stored within the drawer 14 and further tend to seal the drawer against dust and the elements. Consequently, the height of the walls is selected such that they nearly fill the front opening 26 of box 12, and thus provide an effective seal to the device.

The drawer 14 is adapted such that it may be placed into box 12 in either of two orientations, the "shelf orientation", illustrated in FIGS. 1 and 8, and the "upright orientation", illustrated in FIG. 7. The construction of the flanges 40 and walls 41, 42, 43 and 44 of drawer 14 is are adapted such that the drawer 14 is equally applicable to either orientation. To accomplish this purpose, the flanges 40 are situated such that they will be accessible from the outside of box 12 when the drawer 14 is in the closed position as illustrated in FIG. 8 regardless of the orientation chosen. Thus the flanges 40 are placed so as to be respectively adjacent to second wall 42 and third wall 43. Consequently, second wall 42 and third wall 43 are displaced inward from the edges of back base 37.

Because of the two orientations, first wall 41 and fourth wall 44 will, in one or the other orientation, enter box 12 first and be required to slide smoothly all the way to the back of the interior of box 12. Either second wall 42 or third wall 43 will always provide the front exterior wall of drawer 14. Since walls 42 and 43 are either the most exterior wall of drawer 14 or are to one side of drawer 14, neither of these walls needs to provide room for depression 28 and consequently may be of greater height to provide an appropriate seal for the drawer against the interior of box 12.

The sealing characteristics of the device 10 are further enhanced by the recession of second wall 42 and third wall 43 from the edges of back space 37. The result of this recession, which forms flanges 40, is that when the drawer 14 is in the closed position the exterior wall, being third wall 43 in the "shelf orientation", and second wall 42 in the "upright orientation", is fully contained in the interior of box 12. The interior top edge of the exterior wall abuts against the front edge of depression 28 when the drawer 14 is closed. This helps complete the seal (see FIGS. 1 and 7).

It may be seen, particularly in FIG. 7, that one of the flanges 40 of drawer 14 will be to the side of drawer 14 as it is slid into box 12. The recession of wall 43 from the edge of back base 37 as shown in FIG. 7 thus provides an airflow path along the outside of wall 43 and into the interior of box 12. Such an airflow path is undesirable because it allows access of dust and the elements to the interior of the box and consequently to the media 15 contained within the drawer 14. To alleviate this condition, back base 37 further includes a pair of dust guards 45, respectively situated adjacent to second wall 42 and third wall 43. Dust guards 45 have a height equal to that of second and third walls 42 and 43 and extend respectively perpendicularly outward from the surfaces of second and third walls 42 and 43 to the edges of the back base 37. The dust guards 45 effectively seal the drawer 14 against the sides of the interior of box 12 when the drawer 14 is in the closed position. Dust guards 45 further provide a second means, in addition to the flanges 40 by which the drawer may be grasped to pull with sufficient force to release the snap-lock created by the interaction of protrusions 39 with the interior surface of box 12.

It is desirable to provide a means for retaining the media 15 or other items to be stored within the device 10 within drawer 14 when the drawer is in the open position. To this end, drawer 14 is provided with a gate 46 (see FIGS. 1, 6 and 7). Gate 46 is mounted, by way of a free hinge 48, to the edge of the fourth wall 44 which is farthest displaced from the back base 37. Gate 46 is a flat rectangular plate extending across a portion, between one-fourth and one-half for the best results, of the opening formed by the back base and the first, second, third and fourth walls 41, 42, 43, and 44 of drawer 14. Gate 46, like back base 37, is constructed in an open manner to conserve weight and material.

Attached perpendicularly to gate 46 are a pair of side members 49. Side members 49 are situated on the side edges of gate 46 to extend back into drawer 14 towards back base 37. Side members 49 engage a pair of stops 50 which are attached to the interior of first wall 41 and third wall 43 of drawer 14. The interaction of side members 49 with stops 50 limits the angle of rotation of gate 46 on free hinge 48. Thus gate 46 is allowed to tilt forward on free hinge 48 until such time as side members 49 engage stops 50. The advantage gained from such an arrangement is that when drawer 14 is in the open position in the "shelf" or "upright orientation", the weight of the media 15 or other items stored therein will bias gate 46 to tilt forward, thus allowing ready access to the media 15 or other items stored in the drawer 14. However, since it is not desirable to have the media 15 fall out of drawer 14, the tilt of gate 46 is restricted by side members 49 and stops 50 to an angle which allows ready access to the media 15 but yet retains them within the drawer 14.

The front lower surface of gate 46 is provided with a support ridge 52 which extends outward from the body of gate 46 and laterally across such body. As shown in FIG. 7, this support ridge 46 engages the front edge of box 12 when the drawer is in the "upright orientation". The engagement of support ridge 52 upon the front edge of right-side wall 16 of box 12 provides a means by which drawer 14 may be held in the open position in the "upright orientation".

As seen in FIGS. 1 and 7, the two orientations of drawer 14 within box 12 provide for ready access to the media contained within the device 10 whether the device is in the "shelf orientation" where access is to be from the front, or in the "upright orientation" where access is to be from above, such as in a file drawer. The versatility provided by these alternate orientations makes the media storage device 10 adaptable to a much greater number of applications than the devices of the prior art. These advantages are enormous, particularly when considered in addition to the advantages provided by the stable stacking and interlocking means.

In addition to the shelf orientation and the upright orientation, it is also possible to utilize the present invention in a "horizontal orientation". In the horizontal orientation, the box 12 is arrayed such that right side wall 20 faces downward and top wall 22 extends to the right when the box is viewed from front opening 26. In the "horizontal orientation", the drawer 14 may br slid into the box 12 with the first wall 41 entering first, as is shown in FIG. 1, or with the fourth wall entering first as illustrated in FIG. 7.

A difficulty with utilizing the horizontal orientation with the preferred embodiment illustrated in FIGS. 1 through 8 is that access to the media 15 stored therein is limited by gravity. In both the "shelf" and the "upright orientations" the opening of drawer 14 is towards the front and the media are stored on edge, as shown in FIG. 8. Consequently, when drawer 14 is in the open position, the media naturally lean forward against gate 46 for ready access. However, in the "horizontal orientation", the media are laying flat upon their back and the force of gravity prevents ready access. This difficulty is overcome by utilizing an alternate embodiment for the drawer 14, which is illustrated in FIG. 9.

FIG. 9 is a cross-sectional view of an alternate drawer 56. FIG. 9 is analogous to FIG. 6 in that it is the same view of the drawer mechanism. The difference in the drawers 14 and 56 lies in the addition of several extra elements to the alternate drawer 56. It may be seen that the majority of the elements of drawer 56 are the same as those of drawer 14. Where the elements are the same, they are designated with the same reference character as in the drawer 14 and distinguished by a prime.

The gate 46' of the drawer 56 includes modified side members 58, which extend back further toward back base 37' than do the side members 49 of the drawer 14 illustrated in FIG. 6. The drawer 56 is further provided with a back flap 60, which is attached by a flap hinge 62 to a portion of fourth wall 44' situated very close to back base 37'. When tilted completely back upon flap hinge 62, back flap 60 rests against back base 37' and provides a flat rectangular slab which effectively fills the entire back interior surface of alternate drawer 56. However, as is shown in FIG. 9, back flap 60 may tilt forward upon flap hinge 62. In order to induce the forward tilting of back flap 60, particularly in opposition to the force of gravity, alternate drawer 56 is further provided with a spring 64 or some other biasing means.

The alternate embodiment operates as follows. When the alternate drawer 56 is in the open position, spring 64, in conjunction with flap hinge 62, urges back flap 60 to tilt forward or upward. This causes the media 15, which may be stored in the area between the front surface of flap 60 and the back surface of gate 46' to be similarly tilted forward or upward. Gate 46' is urged to tilt forward both by the force of the media upon its back surface and also by the force of spring 64 delivered directly through alternate side members 58, which abut against the front surface of back flap 60. The degree of tilt permitted gate 46' is limited by the action of stops 50', which engage alternate side members 58. Since alternate side members 58 also engage back flaps 60, stops 50' also restrict the tilt of back flap 60.

When it is desired to close the alternate drawer 56, gate 46' and back flap 60 must be forced back against spring 64 to allow the alternate drawer 56 to be contained within box 12. The alternate side members 58 act in this case to prevent abrasion or other contact with the surfaces of the media. This is accomplished because a force directly upon the front of gate 46', such as will be encountered when the drawer is pushed into the box, is directly delivered to back flap 60 through side pieces 58. Thus the force of spring 64 is counteracted and the media will lie flat in the drawer without the necessity of any direct contact with the media itself.

A second alternate drawer for use with the exterior box 12 is illustrated in FIGS. 10 through 14 and designated by the general reference character 70. The drawer 70 is designed so as to be fixed within the box 12 such that it slides freely but is not completely removable from the box. However, the drawer 70 accomplishes the same dual-orientation advantages of drawer 14 by having a movable gate means, illustrated in FIGS. 13 and 14, which may be placed in the drawer 70 in either of two orientations. Thus the same usage of drawer 70 may be used as is available with drawer 14 of the embodiment 10.

Referring now to FIG. 10, a left-side elevational view of the drawer 70 is shown illustrating the drawer element itself with the gate removed. The drawer 70 is illustrated as it would be utilized in the "shelf orientation." The drawer 70 includes a front piece 72, a bottom side wall 74, a back side wale 76, a top side wall 78, and a right side panel 80. Drawer 70 is open to the left side. The front piece 72, the side walls 74, 76 and 78 and the side panel 80 form a box open to the left side. In this, the "shelf orientation," the contents of drawer 70, typically diskettes, will rest upright in the drawer leaning backwards against right side panel 80.

A short gate support wall extension 79 extends into drawer 70 from the front end of bottom side wall 74. Gate support wall extension 79 provides a connection buttress for insertion of a gate into drawer 70 when the device is to be used in the "shelf orientation."

Right side panel 80 is provided with a large central aperture 81. Central aperture 81 is optional and serves no functional purpose other than to lessen the amount of material necessary to construct drawer 70. Since the typical contents of drawer 70 are magnetic diskettes, there is no necessity for supporting the contents in the area of central aperture 81. Removing this material from right side panel 80 merely lowers the cost and the weight of drawer 70.

Front piece 72 is connected to right side panel 80 only. An extension of right side panel 80 extends forward of bottom side wall 74 and top side wall 78 to connect with the right portion of front piece 72. A pair of slits 82 in right side panel 80 provide that the connection to front piece 72 is a relatively elastic extension of right side panel 80 such that front piece 72 is not rigidly held in exact orientation with the remainder of drawer 70.

Front piece 72, as is more clearly shown in FIG. 12, serves as the front wall of drawer 70, a dust guard element which prevents the incursion of dust into the interior of box 12, and as a handle for opening the drawer 70. Accordingly, the right side edge of front piece 72 extends outward to form a handle by which the front piece 72, and consequently the drawer 70, may be grasped by the user. The interior facing portion of front piece 72 is a planar wall forming the front portion of the drawer 70 and also forming a dust guard protecting the interior of box 12.

The drawer 70 is also provided with a pair of slide-pivot posts 84 which interact with the drawer guides 35 and 36 of box 12, as illustrated in FIG. 3. When the drawer 70 is utilized with box 12, the drawer guides 35 and 36 may be sealed in front such that drawer 70 is permanently held within box 12. Since drawer 70 is adapted for use with either of two gate orientations, it is unnecessary to remove drawer 70 from box 12 in order to accomplish the same purpose as is accomplished with removable drawer 14. As is more clearly illustrated in FIG. 12, each slide-pivot post 84 is shaped to provide a rounded post portion about which drawer 70 may partially pivot when drawer 70 is fully extended from box 12 but which is stopped from complete rotation by a wedge portion at the back of the post.

Right side panel 80 is also provided with leg apertures 86 at its lower front, lower back, and upper back corners. These leg apertures 86 are adapted for receiving leg protuberances on the gate element to be inserted within the drawer 70.

FIG. 11 illustrates drawer 70 from a back elevational view. In this illustration, it may be seen that back side wall 76 is scalloped to provide relative minimum and maximum areas. This scalloping is advisable to provide ample support for the gate means while minimizing the amount of material necessary. Back side wall 76 is provided, in the vicinity of its lower right corner, with a gate post aperture 88. Gate post aperture 88 is adapted for receiving a post on the gate mechanism such that the gate mechanism may rotate about the posts inserted in aperture 88 in back side wall 76 and in a similar aperture 88 situated opposite in front gate support wall extension 79 (illustrated in phantom).

In this view, it may also be seen that front piece 72 extends laterally beyond the remaining walls in drawer 70 to form an effective dust guard. It may also be seen that the exterior surface of right side panel 80 is provided with a pair of snap-lock wedges 89. Snap-lock wedges 89 interact with the interior surface of box 12 to provide a snap-lock means for holding the drawer 70 in place when it is fully closed. This snap-lock means prevents the inadvertent opening of drawer 70 when the storage device is tipped or dropped.

FIG. 12 illustrates, in a bottom elevational view, the drawer 70, particularly showing the construction of bottom side wall 74 and top side wall 78. In this view, it may be seen that bottom side wall 74 is scalled in a manner similar to back side wall 76. It may also be seen that top side wall 74 is similarly shaped except that it does not have a central relative maximum. Since the drawer mechanism will rest against bottom side wall 74 in the "shelf orientation" and back side wall 76 in the "upright orientation", the central relative maximum is required. However, since nothing will rest against top side wall 78 in either orientation, this protuberance is unnecessary. Thus, the maximum material removal may be applied to top side wall 78 to provide for minimum cost.

This figure also illustrates the precise shape of slide-pivot post 84 and the shape of snap-lock wedges 89. It may also be seen that bottom side wall 74, and also, symmetrically, top side wall 78, are provided with gate post apertures 88 for receiving the pivot posts of the gate mechanism when drawer 70 is to be utilized in the "upright orientation." A portion of bottom and top side walls 74 and 78 is also cut away to provide opposing leg apertures 86, which come into play when the device is utilized in the "shelf orientation."

FIG. 12 also illustrates the side view shape of front piece 72 and the manner in which front piece 72 is connected to the remainder of drawer 70. The extension element of right side panel 80 can be seen to connect to front piece 72 at a point just inside its right edge. The flexibility provided to this section of right side panel 80 by slits 82 allows the snap-lock mechanism of snap-lock wedges 89 to properly function. A leftward force directed to front piece 72 is sufficient to dislodge the snap-lock caused by the interaction of snap-lock wedge 89 and the interior of box 12. This dislodgment is necessary in order to open alternate drawer 70.

FIG. 13 illustrates an alternate gate mechanism 90 for use with drawer 70. Alternate gate 90 includes a planar front panel 92 and a pair of side panels 94. Front panel 92 is provided with central apertures 95 to save material. Each of the side panels 94 is provided, near its bottom rear portion with a pivot post 96 for meeting with gate post apertures 88 in drawer 70. A leg 98 is formed on each side panel 94 by a downward and backward extension of that panel.

FIG. 14 illustrates, in a side elevational view, one of the side panels 94. This figure particularly illustrates the positioning of pivot post 96 and leg 98.

The drawer 70 and the accompanying gate mechanism 90 are utilized in the following manner. When the device is to be utilized in the "shelf orientation," gate pivot posts 96 are inserted into the gate post apertures 88 in the back side wall 76 and the front gate support wall extension 79. The top surface of front panel 92 extends approximately halfway across central aperture 81. The legs 98 of gate 90 extend into but not completely through the leg apertures 86 at the extreme bottom front and bottom back corners of right side panel 80 when the gate is pivoted forward upon the gate pivot posts 96. The amount of pivot of gate 90 is limited both by the contact between the bottom of front panel 92 and the bottom side wall 74 and also by the contact of legs 98 with the sides of leg apertures 86.

When the device is to be utilized in the "upright orientation," the gate 90, which is constructed of slightly flexible material, is unsnapped from its previous position and reoriented such that gate pivot posts 96 mate with the gate post apertures 88 in the lower back portions of bottom side wall 74 and top side wall 78. In this orientation, since the gate post apertures 88 in the bottom and top side walls are 74 and 78 situated closer to the right side panel 90 than are those in back side wall 76 and front gate support wall extension 79, the legs 98 extend outward and through the leg apertures 86 located slightly forward of the top and bottom back corners of right side panel 80. In this orientation, the legs 98 provide the same function as that of support wedge 52 of gate 46. A portion of legs 98 extend outward through leg apertures 86 when the gate 90 is inclined fully outward. This portion of legs 98 engages the upper edge of right side wall 20 of the box 12. This engagement forces the gate 90 to remain fully inclined forward and also holds the drawer 70 in its fully extended position.

The drawer 70 and its accompanying gate mechanism 90 are designed to accomplish the same purposes as drawer 14 and gate 46 of the preferred embodiment. However, in this embodiment, it is not necessary to remove the entire drawer from the interior of the box. The same effect as is accomplished by the removable drawer 14 is accomplished by reorienting the gate mechanism 90 within the drawer 70.

The preferred embodiments of the present invention may be constructed in any size necessary to store various desired media. Magnetic media appear in disks or diskettes of various sizes, also on mag cards, and also in tape reels or cassettes. The media storage device of the present invention is adaptable for storing any of these media. Other than size adjustments, only minor modifications, such as a divider in the drawer for use with elongated rectangular mag cards, may be necessary in specific applications.

The method by which the devices 10 may be interlocked are variable. For example, the spaces between the ridges may be filled in to form extended protuberances on the side walls of the box 12. The protuberances could then be undercut to serve the same purpose as the cross rails 32 shown in the preferred embodiment. Numerous other equally effective means of interlocking the boxes, both horizontally and vertically, may be used.

The devices of the present invention may be constructed out of any of various materials. Plastic, particularly high impact plastic, is preferable due to the economy of manufacture. However, metal construction may be utilized for particularly valuable information in which fire-proofing storage is required or in which isolation from exterior magnetic fields is desirable.

Although the present invention has been described above in terms of the presently preferred embodiments, it is to be understood that such disclosure is not to be considered as limiting. Accordingly, it is intended that the appended claims be interpreted as covering all alterations and modifications as fall within the true spirit and scope of the invention.

I claim:

1. A device for storing items comprising:
  a hollow box of rectangular configuration including opposing right-side and left-side walls, opposing top and bottom walls and a back wall to frame an elongated rectangular front opening and including in the interior thereof means for receiving and guiding a drawer; and
  a drawer for slidably fitting into the box in either a first or a second planar orientation, said second planar orientation being substantially perpendicular to said first orientation, the drawer including; a base panel, a first wall, a second wall, a third wall opposing said first wall and a fourth wall, said first, second, third and fourth walls extending substantially perpendicularly from and upon said base panel to form, with said base panel, an open rectangular container, the height of said first and fourth walls being slightly less than the height of said second and third walls, gate means extending across between opposing points on said first and third walls to restrain the contents of the drawer, and slide means for engaging the interior of the box such that the drawer slides smoothly in and out of the box in said first and second orientations.

2. A device for storing items as recited in claim 1 wherein:
  said first wall enters the box first in said first orientation and said fourth wall enters the box first in said second orientation and said second and third walls are displaced inward from the outward edges of the back base such that the back base forms a pair of flanges respectively adjacent to said second and third walls and said second and third walls further include a pair of respective dust guards forming perpendicular projections of height equal to that of said second and third walls extending therefrom to the edge of said flange.

3. A device for storing items as recited in claim 2 wherein:
  said gate means includes a rectangular plate of length slightly less than said second wall and a width of between one-fourth and one-half the length of said first wall, a pair of side members extending perpendicularly into the drawer from the ends of said plate, a pair of stops situated on the interior of said first and third walls for slidably receiving said side members and restricting the motion thereof to a desired range, and a free hinge attaching said rectangular plate to the edge of said fourth wall furthest removed from said back base.

4. A device for storing items as recited in claim 1 wherein:
  said means for receiving and guiding a drawer include a channel formed on the interior of said opposing top and bottom walls, said channel being formed such that the drawer may be manipulated so as to be completely removable from the box.

5. A device for storing items comprising:
  a hollow box of rectangular configuration including opposing right-side and left-side walls, opposing top and bottom walls and a back wall to frame an elongated rectangular front opening and including in the interior thereof means for retaining and guiding a drawer; and
  a drawer for slideably fitting into the box, the drawer including a front piece, a bottom side wall, a back side wall, a top side wall and a right side panel framing a substantially square left side opening, said front piece being attached only to said right side panel and set forward of the front edges of said bottom and top side walls, said bottom and said top side walls each including a gate post aperture formed therethrough at opposing points near the intersection of said back side wall and said right side panel for receiving a pivot post of a gate means, and said back wall includes a gate post aperture formed therethrough at a point near the intersection of said bottom side wall and said right side panel, said drawer being adapted to receive gate means for restraining the contents of the drawer, said gate means being mountable in the drawer in either of two mutually perpendicular orientations.

6. A device for storing items as recited in claim 5 wherein:
  said gate means includes a partially flexible planar front panel and a pair of opposing side panels, each of said opposing side panels including a pivot post extending perpendicularly outward therefrom, said pivot posts being adapted for mating with either two sets of pivot post apertures in the drawer such that said gate means may extend across the drawer either from back to front or from bottom to top.

7. A device for storing items as recited in claim 5 and further including:
  a front gate support wall extension extending into the interior of the drawer from the front edge of said bottom side wall, said front gate support wall extension having a gate post aperture formed therethrough near the right side thereof opposing said gate post aperture on said back side wall.

8. A device for storing items as recited in claim 7 wherein:

said gate means includes a partially flexible planar front panel and a pair of opposing side panels, each of said opposing side panels including a pivot post extending perpendicularly outward therefrom, said pivot posts being adapted for mating with either of two sets of pivot post apertures in the drawer such that said gate means may extend across the drawer either from back to front or from bottom to top.

9. A device for storing items as recited in claim 8 wherein:

said right side panel further includes leg apertures formed therethrough at points near the bottom front, bottom back and top back corners thereof; and said gate means further includes legs formed on said side gate panels for extending through said leg apertures when said gate means is inclined leftward.

10. A device for storing items as recited in claim 1 or 5 wherein:

the hollow box includes interlocking means on said walls by which a plurality of the boxes may be stacked vertically and horizontally relative to one another with each box being interlocked with each adjacent box.

11. A device for storing items as recited in claim 10 wherein:

said right-side and left-side walls are of approximately square shape and include means situated on the exterior surfaces thereof such that said interlocking means on said right-side wall of one such box will engage said interlocking means on said left-side wall of an adjacent box so as to restrain relative motion between the adjacent boxes in at least one dimension;

said top and bottom walls are elongated rectangles having widths selected to accommodate a desired thickness of items within the box and further include means of the exterior surfaces thereof such that the means situated on said top wall of one such box engage said interlocking means situated on said bottom wall of an adjacent box so as to restrain relative motion between adjacent boxes in at least one dimension.

12. A device for storing items as recited in claim 11 wherein:

said interlocking means siutated on the exterior of said left-side wall is a wide, shallow "U-shaped" depression having undercut side walls in said left-side wall and opening towards said back wall and closed toward said front wall and said interlocking means situated on the exterior of said right-side wall is a first pair of parallel rails perpendicular to said back wall, the outside edges thereof being undercut so as to mate with the side walls of said depression, being separated by a distance slightly less than the width of said "U-shaped" depression and having a height of slightly less than the depth of said "U-shaped" depression on an adjacent box and being adapted to prevent sliding motion between said boxes except in the direction of the axis of said rails; and said means situated on the exterior of said top wall is a second pair of parallel rails perpendicular to said back wall extending the length of said top wall and including a cross rail, undercut to the back, at the back ends thereof and said interlocking means situated on the exterior of said bottom wall includes a third pair of parallel rails having an exterior separation distance slightly less than the interior separation distance between said second parallel rails and a cross-catch, undercut to the front, situated at the back ends thereof for engaging said cross rail such that said third pair of rails fits slidably between said second pair of rails of an adjacent box and said cross-catch mates with said cross rail so as to prevent relative motion between such adjacent boxes except within a segment along the axis of said second and third pairs of parallel rails.

* * * * *